United States Patent [19]

Koyama

[11] Patent Number: 4,548,830

[45] Date of Patent: Oct. 22, 1985

[54] INSTANT RICE GRUEL AND METHOD FOR PRODUCING SAME

[75] Inventor: Sadao Koyama, Toda, Japan

[73] Assignee: Tokiwado Kaminari Okoshi Co., Ltd., Tokyo, Japan

[21] Appl. No.: 568,092

[22] Filed: Jan. 4, 1984

[30] Foreign Application Priority Data

Sep. 12, 1983 [JP] Japan .................................. 58-167700

[51] Int. Cl.$^4$ .......................... A23L 1/18; A23L 1/164
[52] U.S. Cl. ..................................... 426/620; 426/450; 426/461; 426/462; 426/625
[58] Field of Search ............... 426/620, 450, 449, 461, 426/462, 507, 508, 511, 625

[56] References Cited

U.S. PATENT DOCUMENTS 3,656,965  4/1972  Strommer et al. .................. 426/449
4,233,327  11/1980  Ando et al. .......................... 426/462

FOREIGN PATENT DOCUMENTS 489578  11/1975  Australia .............................. 426/620

Primary Examiner—George Yeung
Attorney, Agent, or Firm—Watson, Cole, Grindle & Watson

[57] ABSTRACT

Novel instant rice gruel is provided which consists of swelled up and α converted rice produced such that raw rice is steamed or boiled to contain 12–13% water, and is then swelled up to 5 to 7 times as its original volume, and of suitable amount of α converted, glutinous rice granules. Its process also is provided. The rice gruel can be quickly and conveniently cooked. Further, the instant rice gruel can be used as emergency food.

12 Claims, No Drawings

INSTANT RICE GRUEL AND METHOD FOR PRODUCING SAME

BACKGROUND OF THE INVENTION

This invention relates to instant or quickly prepared rice gruel, and to a process for producing the same.

Rice gruel is prepared in the manner that raw rice is boiled for a long minutes or even hour. Under this fixed idea, there has never been occurred to provide quickly cooked rice gruel.

OBJECTS OF THE INVENTION

One of the objects of the present invention is to provide quickly prepared rice gruel.

Another object of the invention is to provide rice gruel which can be conveniently cooked.

Still another object of the invention is to provide new type of emergency food.

Other objects and advantages of the invention will be apparant to those skilled in the art.

DETAILED DESCRIPTION OF THE INVENTION

The production process of the instant gruel is explained in the order of respective stages of the process.

Selection of raw rice to be used:

All suitable rice cropped everywhere in the world, can be used including polished (polished, cleaned or milled rate: 20–80%) or unpolished or unmilled rice. Water content in the material rice is preferred to be 13–15%.

Washing of rice:

The rice is washed with water so as to wash out sugar content adhered to rice. One reason therefor is to remove oily substance contained in the sugar from being acidified which results in degradation of the rice and issuance of odour.

The water should be used at the temperature from 15 C. to 35 C., and of the amount of over 200% by weight of the rice to be washed.

First impregnation:

This step comprises impregnating the rice in warm saline solution containing 1–1.5% salt. The purpose of the impregnation in water is to make the rice absorb sufficient water so that its starch content may be collapsed when heated for conversion into a α molecule. The reason for impregnating rice in saline solution is to keep the water content in the water-swelled rice at appropriate level.

The impregnation may be effected under following conditions:

Temperature: Warm solution of 40–60 C.
Water used: 170–200% on the basis of rice to be impregnated.
Duration: 5–10 hours for 15–35 C. solution 4–8 hours for 40–50 C. solution (shortening of time can be realized).
Absorbed Water (5–10 hours): 130–150% of rice
Water cutting: wire cloth of 20–12 mesh for ½–1 hour, automatic centrifuge for 15–20 seconds, etc.
Water content after cutting water: 130–150% on the basis of rice.

First α conversion:

The first α conversion process can be effected by steaming rice under pressure of 0.5 kg/cm$^2$–1 kg/cm$^2$ for 20–30 minutes, or by boiling rice.

Second impregnation:

Water: warm water of 40–60 C.
Duration: 0.5–1 minute
Purpose: To further absorb water so that conversion due to water contained and heat applied thereto, may be increased.
Water absorbed: 190–200% on the basis of material rice
Water cutting: same as first impregnation Second α conversion:

This step is effected at steam pressure of 0.5 kg/cm$^2$–1 kg/cm$^2$ for 10–15 minutes. Excessively long steaming of rice causes melting of rice. The reason for steaming rice twice under pressure is to make rice to absorb as much water as possible for realizing total α conversion and to obtain uniform rice property.

Third impregnation:

The third impregnating step is effected in a manner similar to the procedure of the second impregnation step. In necessary, the rice may be seasoned with aqueous solution of 0.5% each of salt, sugar and seasoning material, for 3–5 minutes at this third step. The impregnation is effected under following conditions:

Water used: 200–300% on the basis of material rice
Water absorbed: 200–230%
Purpose of impregnation: Uniform water absorption so that rice granules may be uniformly unfastened and uniformly dried.
Salt and sugar: used for preventing rice from being cracked and for stabilizing swelling
Seasoning material: used for seasoning and nourishment
Water temperature: 25–60 C.

Attention should be given so that rice granules may not be broken off for not being dried irregular and for not requiring additional work and time. After the rice is impregnated, water is cut off.

Drying with hot air:

Air temperature: 80–110 C.
Duration: 1–3 hours
Water content after dried: 12–14% of material rice (Water content at this stage is not uniform between surface part and core part).

Aging:

Aging is effected for about 4–5 days by keeping rice in paper bags so that water content at every portion or rice granules may become uniform. More preferable content at immediately prior to swelling step next is 12–13%.

Swelling:

Rice volume is swelled to 5 to 7 times of original volume, by applying heated solid medium to the aged rice. For example, solid granules of salt or calcium carbonate (durable at 250 C.) are used which have been heated to 120 C. or over (preferably 150–170 C.) in a rotary drum. The rice is swelled up with the heat conveyed from the heated solids, within about 20–30 seconds. Alternatively, the aged rice may be swelled up by direct fire through metal cloth, roasting, frying with oil, or by applying high-frequency wave (by means of a microwave oven).

Addition of assistant material:

If necessary, sticky material such as α converted glutinous rice may be added so that rice gruel may have viscous property. In the event no sticky property is necessary for the final instant gruel product, addition is not necessary.

Amount used: 30–50% of swelled up rice.

Material: α converted glutinous rice powder, waxy-α powder (glutinous corn) or like material as can be used for preparing α converted rice cake food.

Other material such as seasoning material and dried vegetables may be added to the swelled up rice granules. The seasonings are used for giving good taste and for nourishment in the amount of 5-7% of the swelled rice. The seasonings including oils and fats if preferred, may be added in a form of powder, granules, etc., with containing less than 8% water.

Dried vegetables may be added for giving good taste, for nourishment and for giving good appearance, in an amount of 2-4% based on the swelled up rice. The vegetables having less than 5% water may be a freeze dried or hot air dried product.

The swelled up rice for instant gruel may have a form of:
  A. rice granule (original rice granule);
  B. broken rice granule (half of original rice granule size to powder size);
  C. rice powder; or
  D. mixture of A B and/or C Hot water is added to thus produced instant rice gruel product to prepare an eatable state gruel as follows:
  full size rice granule: 400-650% water on the basis of swelled up rice
  broken rice: 400-650%
  rice powder: 500-700%

As explantion, the instant rice gruel, is obtained from boiled rice by steps of repeated impregnation process, repeated α conversion process, hot air drying, aging and adding thereto seasonings if necessary.

The table below shows the relationship between swelled up rate and the recovery condition at the ready to eat state of the product. As will be seen from the table, the best result is obtained if swelled up rate is 5 to 7 times of original rice volume.

TABLE

| Swelled up (Times) | Poured wat. Temp. (C.) | Poured wat. impreg. time (min.) | Recovery state | Practical time required (min.) | State |
| --- | --- | --- | --- | --- | --- |
| not suitable as gruel | | | | | |
| 2.5 | 100 | 3 | Shortage in water absorption, no recovery | 5 | Flexible recovery |
|  | 80 | 3 | Shortage in water absorption, no recovery | 6 | Flexible recovery |
| 3.5 | 100 | 3 | Shortage in water absorption, no recovery | 5 | Flexible recovery |
|  | 80 | 3 | Shortage in water absorption, no recovery | 6 | Flexible recovery |
| 4.0 | 100 | 3 | A bit recovery time shortage | 4 | A bit flexible recovery like gruel |
|  | 80 | 3 | No recovery | 5 | A bit flexible recovery like gruel |
| 5.0 | 100 | 3 | Complete recovery | 2 | Recovered like boiled rice |
|  | 80 | 3 | recovery | 3 | " |
| 6.0 | 100 | 3 | Complete recovery | 2 | Recovered like boiled rice |
|  | 80 | 3 | recovery | 3 | " |
| 7.0 | 100 | 3 | Complete recovery Recovered as boiled rice | 2 | Recovered like boiled rice, melting touch |
|  | 80 | 3 | Complete recovery Recovered as boiled rice | 3 | Recovered like boiled rice, melting touch |
| 8.0 | 100 | 3 | Complete recovery Recovered as boiled rice | 2 | Recovered like boiled rice, melting touch |
| (a bit burnt colour) | 80 | 3 | Complete recovery Recovered as boiled rice | 3 | Recovered like boiled rice, melting touch |

The physical characteristics of the instant gruel according to the present invention can be summarized as follows:

1. As the result of repeating impregnation and steaming steps, starch content is fully converted to α state. The α converted gruel is tasteful and digestive.

2. Since salt and sugar are solved in water during impregnation, obtained product is glossy, and water permeats uniformly through rice granule, resulting in prevention of cracking and in uniform swelling. Dried granules can be smoothly unfastened.

3. Due to the swelling up, the rice can recover its original boiled state swiftly. Further, soup seasoning can be swiftly absorbed which results in complete permeation of tasteful seasoning.

4. Since α converted glutinous rice is mixed in the swelled up rice granule, suitable sticky property is provided. Accordingly, the instant gruel tastes good and sticky when cooked, just as the normal gruel.

5. Since water content in the swelled up rice is less than 5%, the instant gruel can be preserved for a long time. If good care is taken for not absorbing water, the product is excellent as preserve or storage food. Seasoning of the gruel can be effected easily.

EXAMPLE

| constituent | example No. | | |
| --- | --- | --- | --- |
|  | 1 | 2 | 3 |
| swelled rice | 60 g | 65 g | 65 g |

-continued

| constituent | example No. | | |
|---|---|---|---|
| | 1 | 2 | 3 |
| α converted glutinous rice granule | 32 | 27 | 22 |
| seasoning (powder, granule or liquid prepared in sheet form) | 5 | 5 | 5 |
| dried vegetable | 3 | 3 | 3 |
| hot water | | 280–350 cc | |

The instant gruel of the invention can be prepared in a ready to eat state by adding hot water in a spoon and mixing for about 2–3 minutes. Any one of the type 1, 2 or 3 shown above as well as the amount of hot water can be optionally selected depending on the user's liking.

I claim:

1. A method of producing instant rice gruel which comprises the steps of
   (1) providing a batch of rice,
   (2) washing said batch of rice with water so as to remove any sugar or oily substances thereon,
   (3) contacting the batch of rice obtained in step (2) with a saline solution containing about 1 to 1.5% salt so that the rice will absorb water therein,
   (4) treating the batch of rice obtained in step (3) with boiling water or steam to cause a first α conversion,
   (5) treating the batch of rice obtained in step (4) with water at a temperature of about 40° to 60° C. for about 0.5 to 1 minute so that the rice will absorb additional water therein,
   (6) subjecting the batch of rice obtained in step (5) with steam at a pressure of about 0.5 to 1 kg/cm$^2$ for about 10 to 15 minutes to cause a second α conversion,
   (7) impregnating the batch of rice obtained in step (6) with water having a temperature of about 25° to 60° C. for about 0.5 to 1 minute so that the rice will have a more uniform water content,
   (8) drying the batch of rice obtained in step (7) with hot air,
   (9) aging the batch of rice obtained in step (7) so that the water content in the rice will become even more uniform, and
   (10) heating the batch of rice obtained in step (9) to cause the rice to swell to at least 5 times its original volume.

2. The method as defined in claim 1, wherein in step (4) the batch of rice is subjected to steam at a pressure of about 0.5 to 1 kg/cm$^2$ for about 20 to 30 minutes.

3. The method as defined in claim 1, wherein in step (3) the saline solution containing about 1 to 1.5% salt has a temperature of about 40° to 60° C.

4. The method as defined in claim 1, wherein in step (8) the hot air has a temperature of about 80° to 110° C. and the batch of rice is treated with said hot air for about 1 to 3 hours.

5. The method as defined in claim 1, wherein in step (9) the batch of rice is aged until the water content of the rice is about 12–13%.

6. The method as defined in claim 1, wherein in step (10) the batch of rice is treated with solid particles having a temperature of at least 120° C.

7. The method as defined in claim 1, wherein in step (10) the batch of rice is heated by high frequency waves in a microwave oven.

8. The method as defined in claim 1, including the step of adding α-converted glutinous rice to the batch of rice obtained in step (10).

9. The method as defined in claim 1, including the step of adding flavor-enhancing substances to the batch of rice obtained in step (10).

10. The method as defined in claim 1, including the step of adding nutritional substances to the batch of rice obtained in step (10).

11. The method as defined in claim 1, wherein the water content of the rice in the batch of rice provided in step (1) is about 13 to 15%.

12. An instant rice gruel which is made by the steps of
    (1) providing a batch of rice,
    (2) washing said batch of rice with water so as to remove any sugar or oily substances thereon,
    (3) contacting the batch of rice obtained in step (2) with a saline solution containing about 1 to 1.5% salt so that the rice will absorb water therein,
    (4) treating the batch of rice obtained in step (3) with boiling water or steam to cause a first α conversion,
    (5) treating the batch of rice obtained in step (4) with water at a temperature of about 40° to 60° C. for about 0.5 to 1 minute so that the rice will absorb additional water therein,
    (6) subjecting the batch of rice obtained in step (5) with steam at a pressure of about 0.5 to 1 kg/cm$^2$ for about 10 to 15 minutes to cause a second α conversion,
    (7) impregnating the batch of rice obtained in step (6) with water having a temperature of about 25° to 60° C. for about 0.5 to 1 minute so that the rice will have a more uniform water content,
    (8) drying the batch of rice obtained in step (7) with hot air,
    (9) aging the batch of rice obtained in step (7) so that the water content in the rice will become even more uniform, and
    (10) heating the batch of rice obtained in step (9) to cause the rice to swell to at least 5 times its original volume.

* * * * *